Patented June 17, 1947

2,422,630

UNITED STATES PATENT OFFICE 2,422,630

PREPARATION OF LUBRICANTS

John M. Musselman, South Euclid, and Herman P. Lankelma, Shaker Heights, Ohio, assignors to The Standard Oil Company, Cleveland, Ohio, a corporation of Ohio No Drawing. Application April 12, 1946, Serial No. 661,878

13 Claims. (Cl. 252—32.7)

It is known in the prior art to prepare organic thiophosphates by reacting phosphorus sulfides with oxygen-containing organic compounds; and it has been proposed to apply such thiophosphates in lubricating compositions where extreme pressure characteristics are desirable. Such compounds, however, have the disadvantage of being corrosive, such as to preclude some kinds of usage; and such preparations are also lacking in desirable high stability. In accordance with the present invention, such thiophosphates may be converted into compounds eliminating such disadvantages, and with manufacturing procedure which is particularly convenient.

This application is a continuation-in-part of our application Serial Number 469,118, filed December 18, 1942.

To the accomplishment of the foregoing and related ends, the invention, then comprises the features hereinafter fully described, and particularly pointed out in the claims, the following description setting forth in detail certain illustrative embodiments of the invention, these being indicative however, of but a few of the various ways in which the principle of the invention may be employed.

Organic thiophosphates and thiophosphites as commercially obtainable or as prepared by known procedure, such as by the action of phosphorus sulfides on oxygen-containing organic compounds, at a relatively low temperature, are, in accordance with the invention, subjected to reaction, by means of relatively high temperature, to the removal of at least a major portion of the phosphorus with a sludge and the formation of a stable product. Thus, a thiophosphate or thiophosphoric acid as made by reacting 20 to 25 per cent of phosphorus pentasulfide on an ester wax, such as lanolin, the reaction being carried out at the usual temperature for making a thiophosphate, e. g. up to not over about 225° F., contains around five per cent of phosphorus and ten per cent of sulfur. In accordance with the present invention, such a thiophosphate as a starting material is subjected to reaction at a temperature above 275° F., and up to 350° F., and as high as 400° F. in some cases, depending on the thiophosphate being treated. The optimum for most thiophosphates is around 300° to 340° F. After the reaction is complete which occurs in about one to one and a half hours, or sometimes longer, the improved reaction product is separated from a precipitate or sludge, by centrifuging, filtering or settling. This product contains all or most of the sulfur in the thiophosphate, and the amount of phosphorus remaining is less than half of the phosphorus in the thiophospate, i. e., a major portion of the phosphorus has been removed. In some cases it is less than one per cent. Whether it is mechanically carried or chemically combined has not been determined. The amount of sulfur depends upon the particular oxygen containing organic material primarily entering into the formation of the thiophosphate or thiophosphite, and the amount of phosphorus pentasulfide or other phosphorus sulfide employed. In general, it is desirable to attain final products having a sulfur content as high as ten to fifteen per cent.

The process may be applied to any organic thiophosphate. Preferably, the thiophosphate should have a boiling point above the temperature to which it is to be heated in the process of the invention, since otherwise it would be necessary to use pressure. While this is not excluded it is not preferred.

Any oxygen-containing organic compound reactive with a phosphorus sulfide to form a thiophosphate may be used in making the thiophosphate starting material by reaction with a phosphorus sulfide. Examples of these oxygen-containing organic compounds, given merely as illustrative, include the general classes ester waxes, other esters, acids especially carboxylic acids, alcohols, ethers, aldehydes, ketones, oxidized oils, fatty oils, etc. The same preference is expressed for the oxygen-containing compound, namely, that it have a boiling point high enough to form a thiophosphate which has a boiling point above the temperature at which the thiophosphate is heated during the reaction in order that the process of the invention may be carried out in an open reaction vessel.

Examples of ester waxes include lanolin, degras, carnauba wax, japan wax, sperm oil, etc. Examples of other esters include glyceride esters of fatty acids such as fatty oils, namely, cocoanut oil and lard oil and fats such as tallow. Other esters are esters of dihydric and monohydric alcohols, such as glycol stearate, methyl stearate, ethyl oleate, propyl palmitate, cetyl or oleyl propionate or butyrate.

Examples of acids including, caproic, myristic, palmitic, stearic and oleic acids. Polybasic acids and cyclic acids such as are derived from mineral oils may also be used, such as naphthenic acid.

Examples of alcohols include cetyl alcohol, stearyl alcohol, oleyl alcohol and various glycols, and cyclic alcohols. The ethers include, for example, dioctyl ether. The ketones include, for example, palmitone. The oxidized oils include oxidation products of paraffin wax and other hydrocarbon oils; these are usually a mixture of acids, aldehydes, ethers, alcohols, etc. Other oxygenated compounds include dichlorostearic acid, methyldichloro stearate and methyl chloronaphthanate. Among the hydroxy substituted compounds may be mentioned hydroxy stearic acid, and dichloro dihydroxy stearic acid.

The product with its phosphorus content thus diminished may, as a further refinement of the invention, be reacted to conversion into a metal compound, as by means of a hydroxide or oxide of a metal, as for example of calcium, barium, aluminum, zinc, alkali metals, etc., or a plurality of metals. Or, in some cases, organic bases, as amines, may be employed. Products prepared by action of bases, metallic or other, have an advantage of even less corrosive tendency, and especially good detergent properties.

The final product may be applied as such in lubricant usages with gearing, etc. where desired. Or, more usually it may be compounded with a lubricating oil, as for instance oil of 45 to 200 sec. Saybolt Universal at 210, and in amounts of one-half to five per cent or more, such as ten to 50 per cent as desired.

Other modes of applying the principle of the invention may be employed, change being made as regards the details described, provided the features stated in any of the following claims, or the equivalent of such, be employed.

We claim:

1. A process of preparing a product suitable for use as a lubricant and as an addition agent to improve lubricating oils, which comprises heating an organic thiophosphate reaction product of a phosphorus sulfide and an aliphatic oxygen-containing organic compound to a temperature above 275° F. for a length of time to form a separable sludge containing phosphorus, and a desired decomposition product having a phosphorus content of less than half that of the thiophosphate starting material and most of the sulfur content thereof, and separating said desired decomposition product from the sludge so formed during the heating.

2. A process of preparing a product suitable for use as a lubricant and as an addition agent to improve lubricating oils, which comprises heating an organic thiophosphate reaction product of a phosphorus sulfide and an aliphatic organic ester to a temperature above 275° F. for a length of time to form a separable sludge containing phosphorus, and a desired decomposition product having a phosphorus content of less than half that of the thiophosphate starting material and most of the sulfur content thereof, and separating said desired decomposition product from the sludge so formed during the heating.

3. A process of preparing a product suitable for use as a lubricant and as an addition agent to improve lubricating oils, which comprises heating an organic thiophosphate reaction product of phosphorus pentasulfide and an ester wax to a temperature above 275° F. for a length of time to form a separable sludge containing phosphorus, and a desired decomposition product having a phosphorus content of less than half that of the thiophosphate starting material and most of the sulfur content thereof, and separating said desired decomposition product from the sludge so formed during the heating.

4. A process of preparing a product suitable for use as a lubricant and as an addition agent to improve lubricating oils, which comprises heating an organic thiophosphate reaction product of phosphorus pentasulfide and degras to a temperature above 275° F. for a length of time to form a separable sludge containing phosphorus, and a desired decomposition product having a phosphorus content of less than half that of the thiophosphate starting material and most of the sulfur content thereof, and separating said desired decomposition product from the sludge so formed during the heating.

5. A process of preparing a product suitable for use as a lubricant and as an addition agent to improve lubricating oils, which comprises heating an organic thiophosphate reaction product of a phosphorus sulfide and an aliphatic oxygen-containing organic compound to a temperature above 275° F. for a length of time to form a separable sludge containing phosphorus, and a desired decomposition product having a phosphorus content of less than half that of the thiophosphate starting material and most of the sulfur content thereof, separating said desired decomposition product from the sludge so formed during the heating, and then reacting said decomposition product with a reactive base to form the corresponding salt compound of said decomposition product.

6. A process of preparing a product suitable for use as a lubricant and as an addition agent to improve lubricating oils, which comprises heating an organic thiophosphate reaction product of a phosphorus sulfide and an aliphatic oxygen-containing organic compound to a temperature above 275° F. for a length of time to form a separable sludge containing phosphorus, and a desired decomposition product having a phosphorus content of less than half that of the thiophosphate starting material and most of the sulfur content thereof, separating said desired decomposition product from the sludge so formed during the heating, and then reacting said decomposition product with a reactive metallic base to form the corresponding salt compound of said decomposition product.

7. A process of preparing a product suitable for use as a lubricant and as an addition agent to improve lubricating oils, which comprises heating an organic thiophosphate reaction product of a phosphorus sulfide and an aliphatic organic ester to a temperature above 275° F. for a length of time to form a separable sludge containing phosphorus, and a desired decomposition product having a phosphorus content of less than half that of the thiophosphate starting material and most of the sulfur content thereof, separating said desired decomposition product from the sludge so formed during the heating, and then reacting said decomposition product with a reactive basic alkaline earth compound to form the corresponding alkaline earth metallic compound of said decomposition product.

8. A process of preparing a product suitable for use as a lubricant and as an addition agent to improve lubricating oils which comprises heating an organic thiophosphate reaction product of phosphorus pentasulfide and an ester wax to a temperature above 275° F. for a length of time to form a separable sludge containing phosphorus, and a desired decomposition product having a phosphorus content of less than half that of the thiophosphate starting material and most of the sulfur content thereof, separating said desired decomposition product from the sludge so formed during the heating, and then reacting said decomposition product with a reactive basic alkaline earth compound to form the corresponding alkaline earth metallic compound of said decomposition product.

9. A process of preparing a product suitable for use as a lubricant and as an addition agent to improve lubricating oils which comprises heating an organic thiophosphate reaction product of phosphorus pentasulfide and degras to a temperature above 275° F. for a length of time to form a separable sludge containing phosphorus, and a desired decomposition product having a phosphorus content of less than half that of the thiophosphate starting material and most of the sulfur content thereof, separating said desired decomposition product from the sludge so formed during the heating, and then reacting said decomposition product with a reactive basic calcium compound to form the corresponding calcium compound of said decomposition product.

10. A process of preparing a product suitable for use as a lubricant and as an addition agent to improve lubricating oils, which comprises heating an organic thiophosphate reaction product of phosphorus pentasulfide and an ester wax to a temperature above 275° F. for a length of time to form a separable sludge containing phosphorus, and a desired decomposition product having a phosphorus content of less than about one per cent and most of the sulfur content of said thiophosphate, and separating said desired decomposition product from the sludge so formed during the heating.

11. A process of preparing a product suitable for use as a lubricant and as an addition agent to improve lubricating oils, which comprises heating an organic thiophosphate reaction product of phosphorus pentasulfide and lanolin to a temperature above 275° F. for a length of time to form a separable sludge containing phosphorus, and a desired decomposition product having a phosphorus content of less than about one per cent and most of the sulfur content of said thiophosphate, and separating said desired decomposition product from the sludge so formed during the heating.

12. A process of preparing a product suitable for use as a lubricant and as an addition agent to improve lubricating oils which comprises heating an organic thiophosphate reaction product of phosphorus pentasulfide and an ester wax to a temperature above 275° F. for a length of time to form a separable sludge containing phosphorus, and a desired decomposition product having a phosphorus content of less than about one per cent and most of the sulfur content of said thiophosphate, separating said desired decomposition product from the sludge so formed during the heating, and then reacting said decomposition product with a reactive basic alkaline earth compound to form the corresponding alkaline earth metallic compound of said decomposition product.

13. A process of preparing a product suitable for use as a lubricant and as an addition agent to improve lubricating oils which comprises heating an organic thiophosphate reaction product of phosphorus pentasulfide and lanolin to a temperature above 275° F. for a length of time to form a separable sludge containing phosphorus, and a desired decomposition product having a phosphorus content of less than about one per cent and most of the sulfur content of said thiophosphate, separating said desired decomposition product from the sludge so formed during the heating, and then reacting said decomposition product with a reactive basic calcium compound to form the corresponding calcium compound of said decomposition product.

JOHN M. MUSSELMAN.
HERMAN P. LANKELMA.

REFERENCES CITED

The following references are of record in the file of this patent:

UNITED STATES PATENTS

| Number | Name | Date |
|---|---|---|
| 2,142,998 | Chittick | Jan. 10, 1939 |
| 2,167,867 | Benning | Aug. 1, 1939 |
| 2,242,260 | Prutton | May 20, 1941 |
| 2,307,183 | Zimmer et al. | Jan. 5, 1943 |
| 2,308,427 | Roehner et al. | Jan. 12, 1943 |